March 18, 1958  J. T. DAVIDSON ET AL  2,827,120

STRIP FEEDING AND CUTTING MECHANISM

Filed June 11, 1954  10 Sheets-Sheet 1

INVENTORS
JOHN T. DAVIDSON
PERCY G. STIMSON
BY Tom Walker

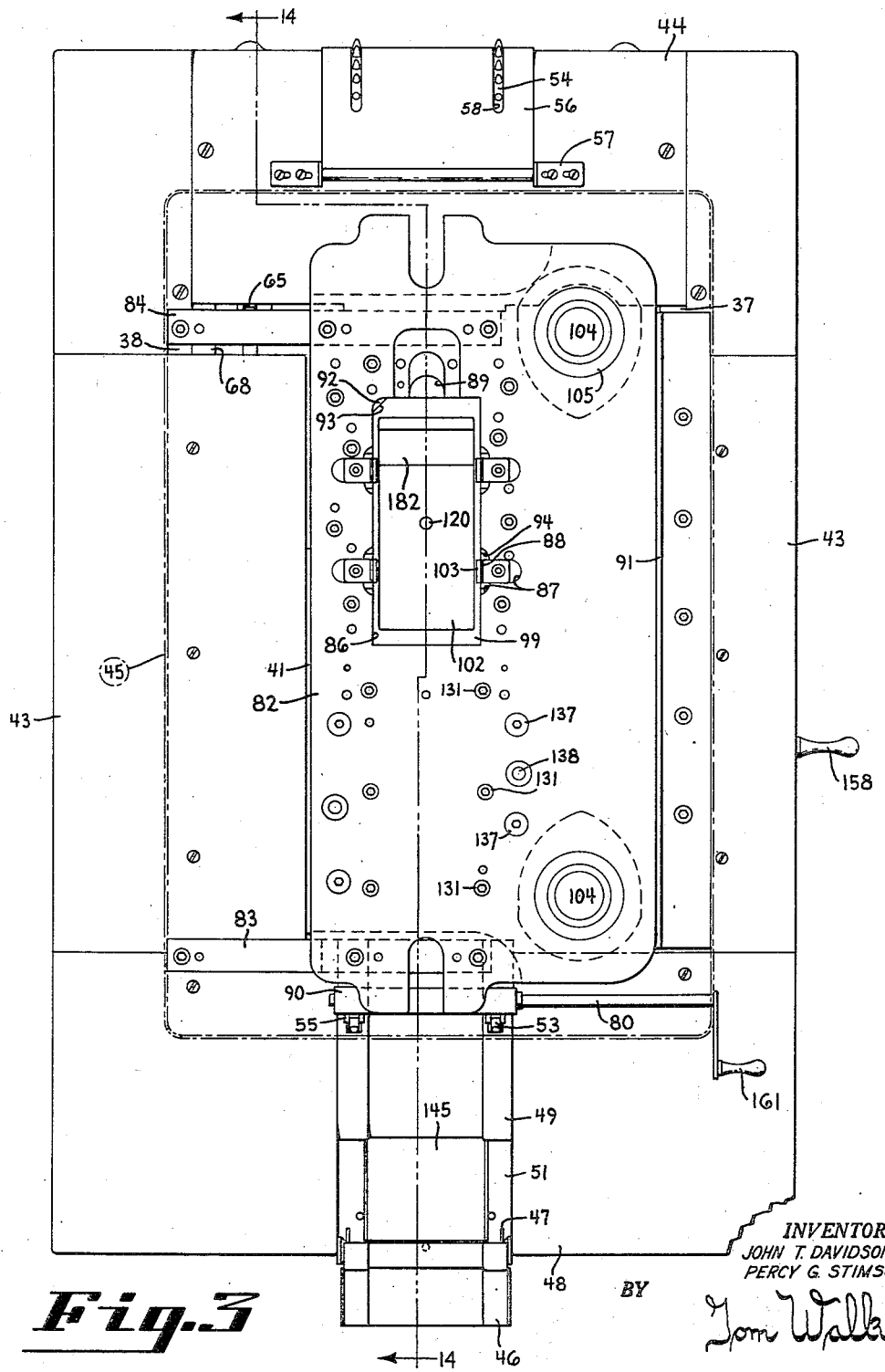

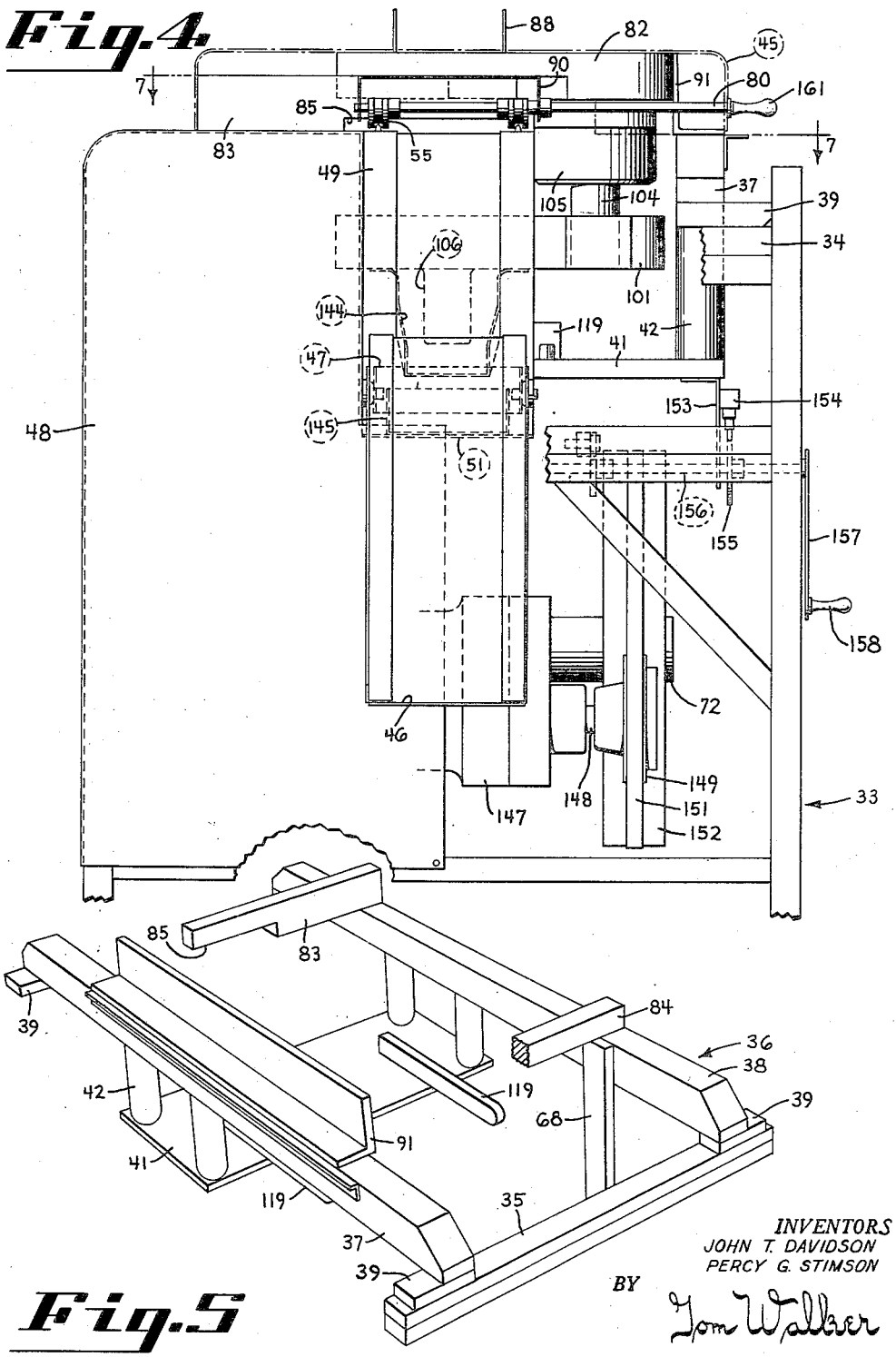

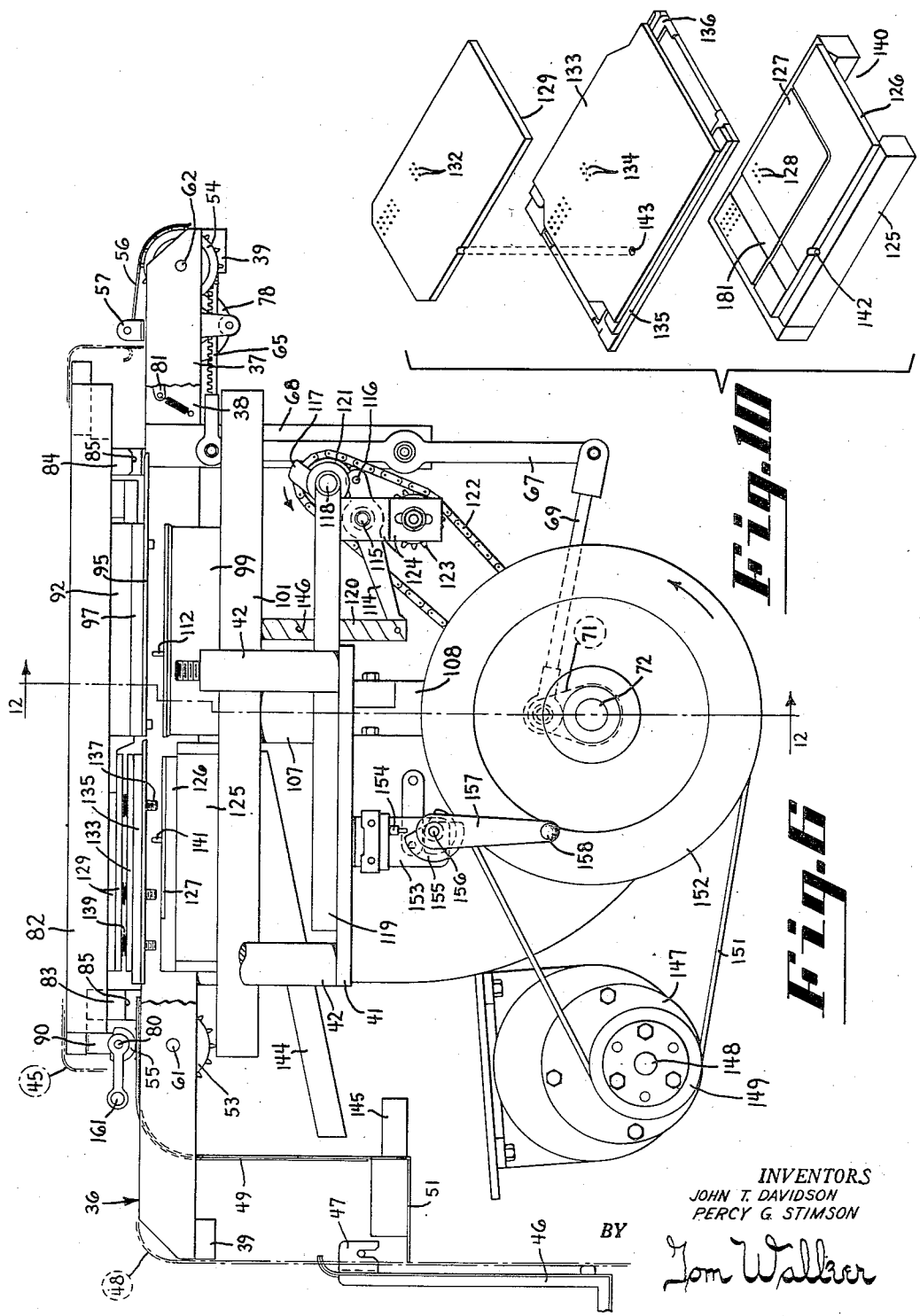

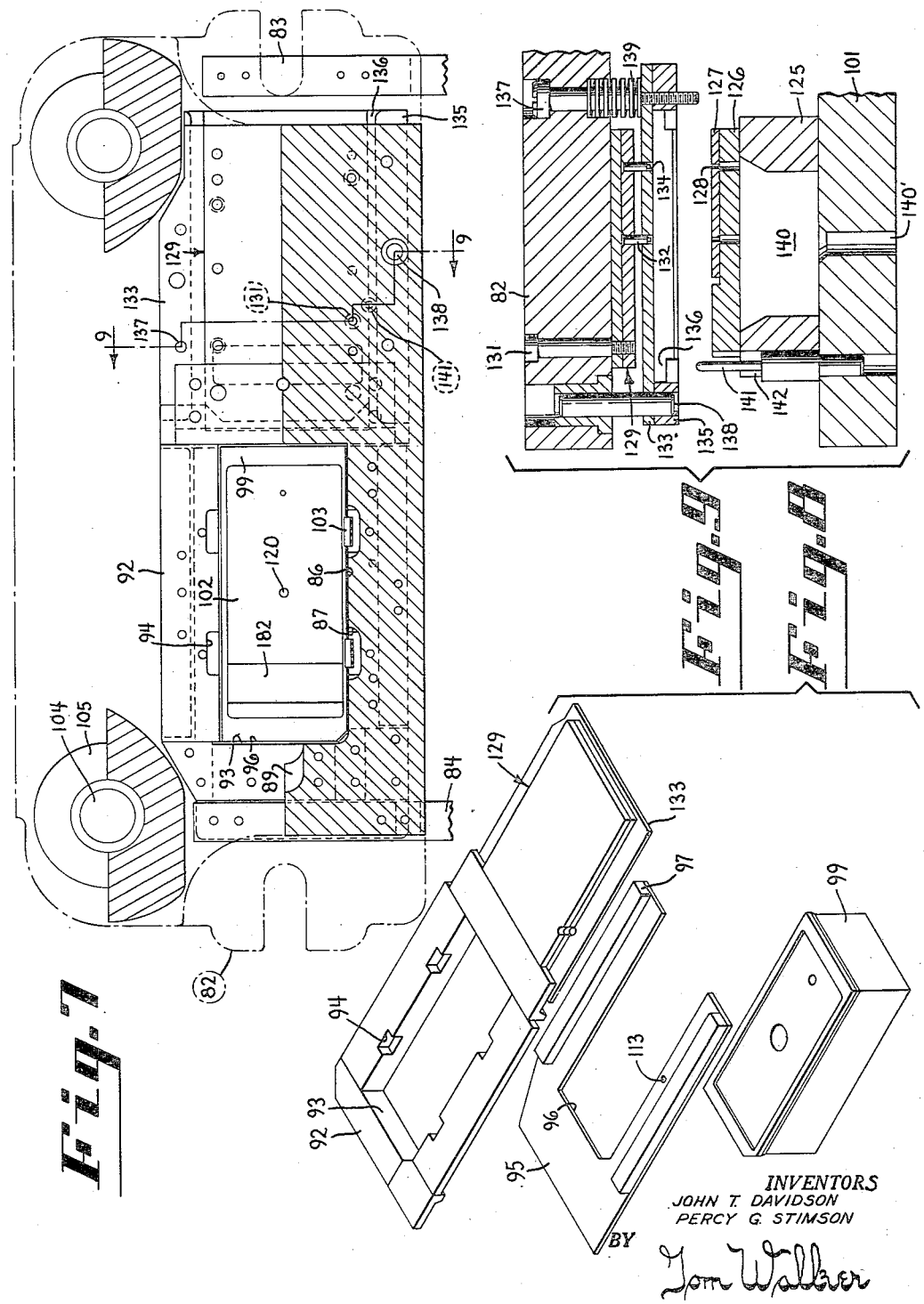

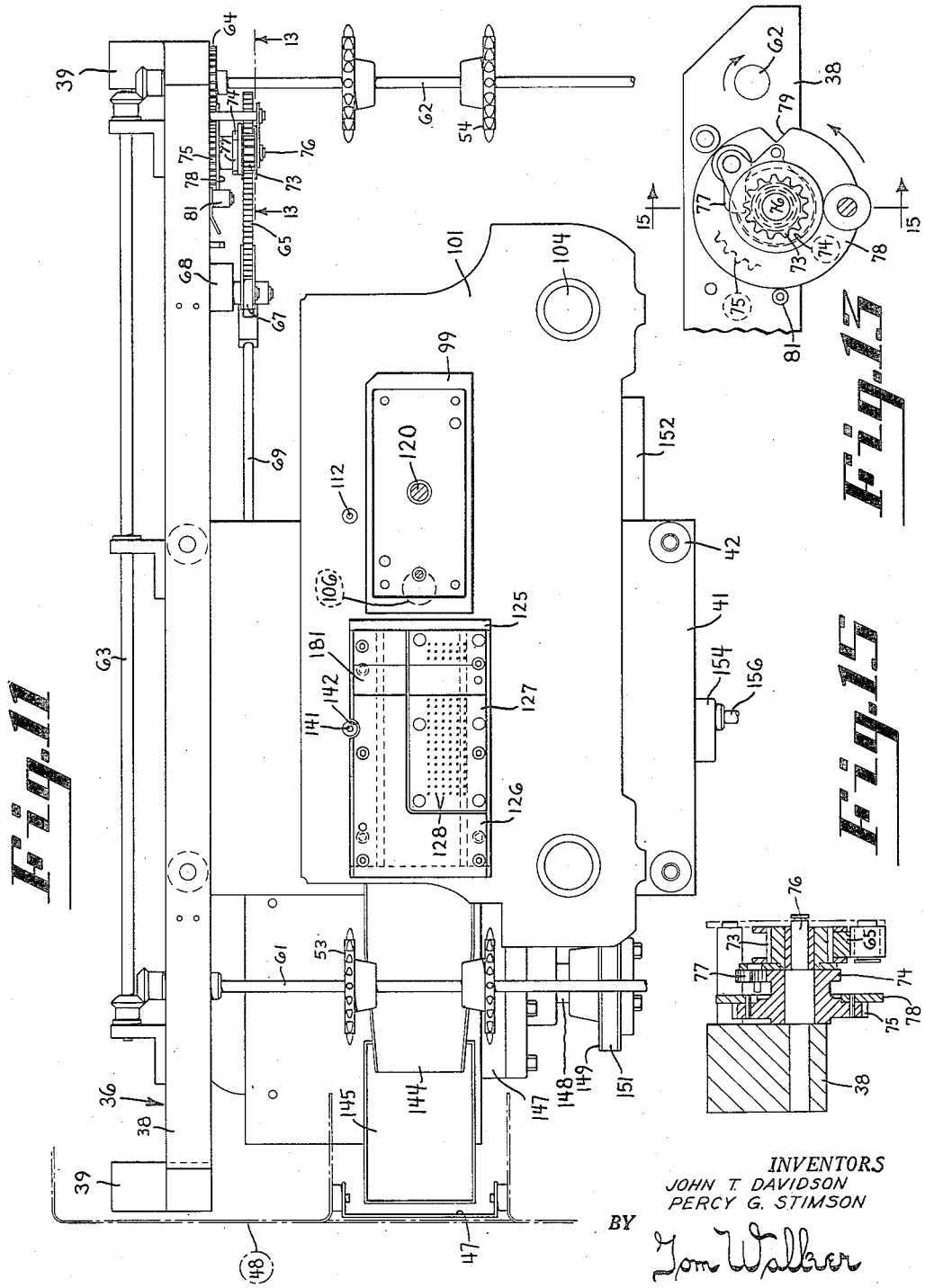

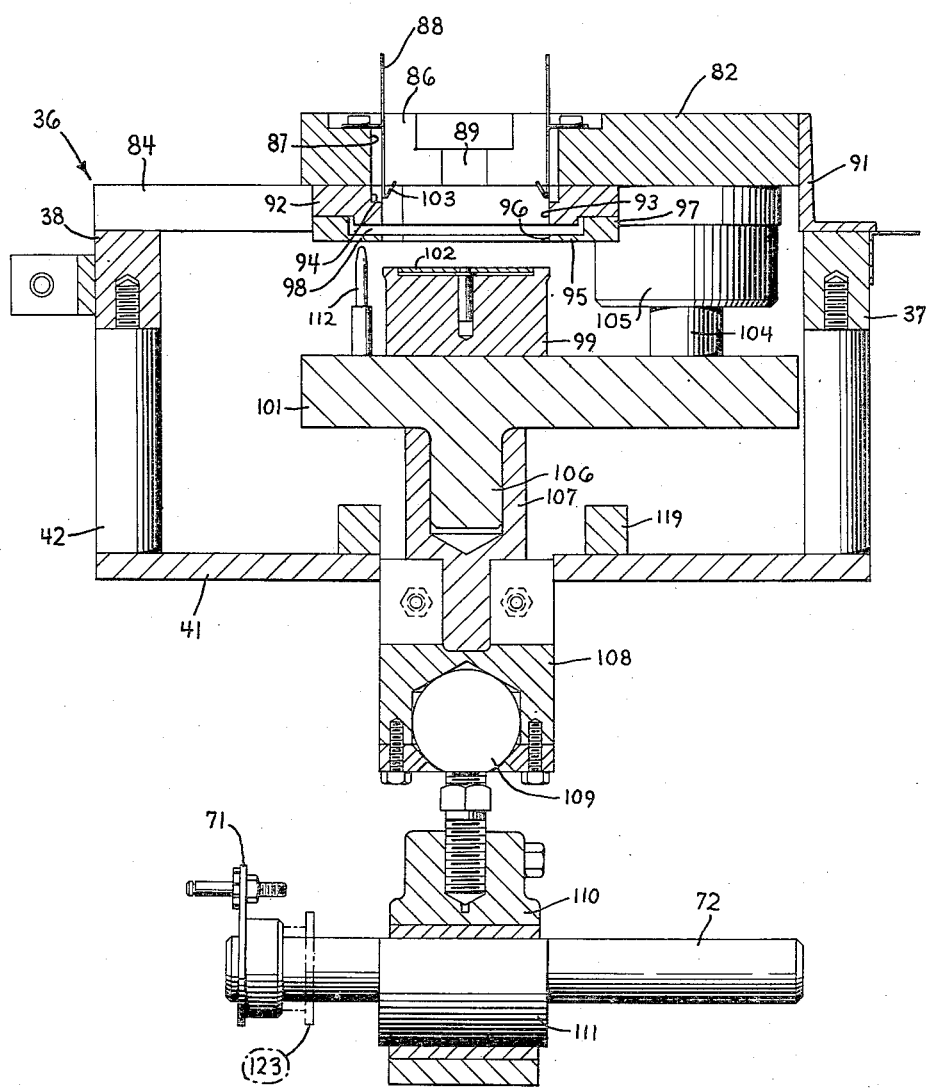

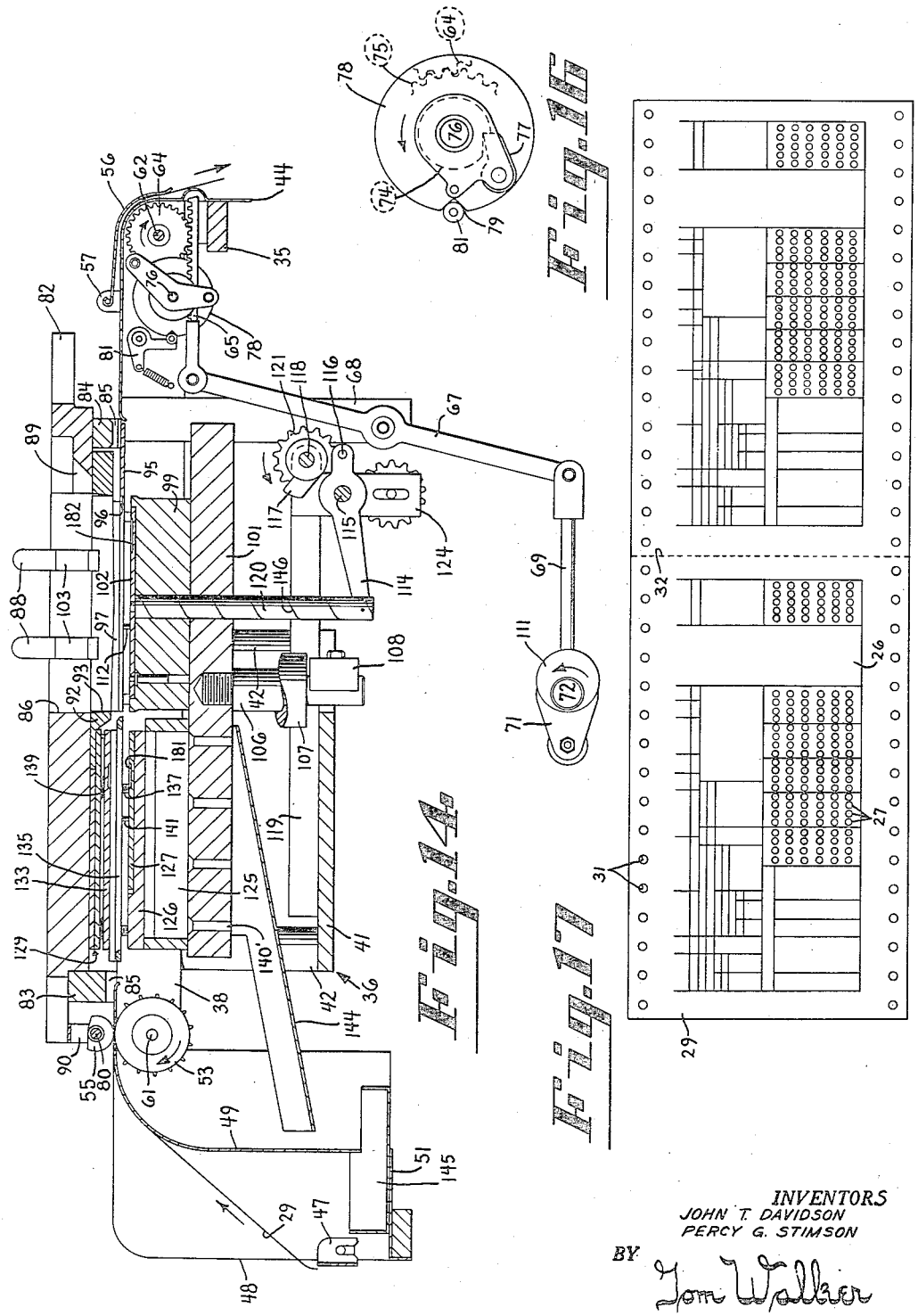

March 18, 1958　　J. T. DAVIDSON ET AL　　2,827,120
STRIP FEEDING AND CUTTING MECHANISM
Filed June 11, 1954　　10 Sheets-Sheet 9
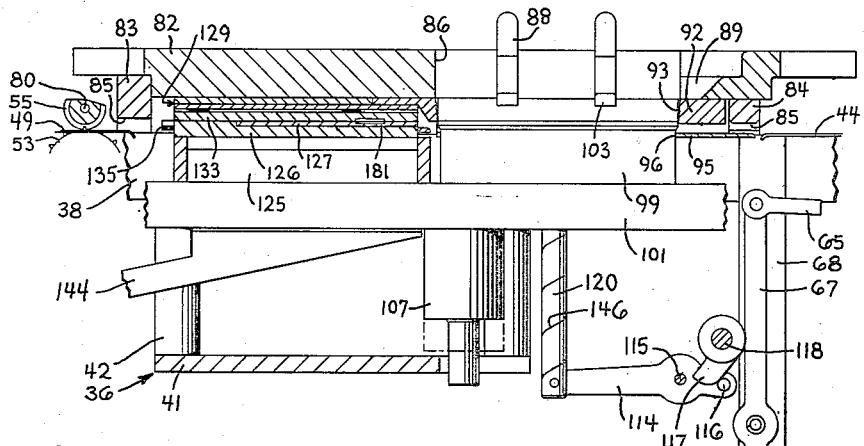
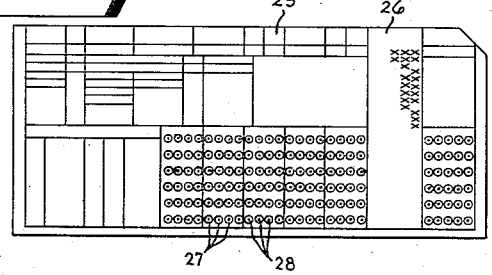
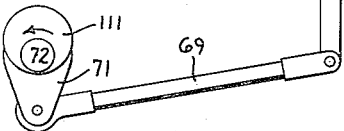
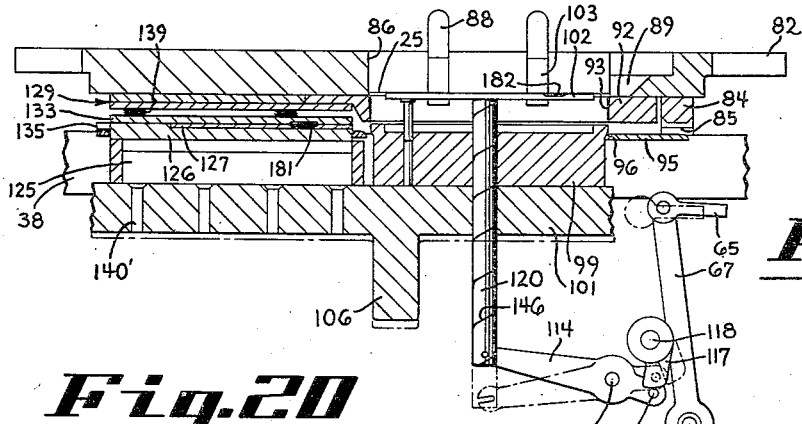
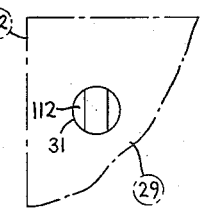
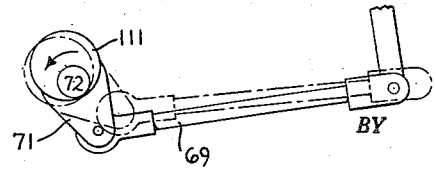
INVENTORS
JOHN T. DAVIDSON
PERCY G. STIMSON
BY Tom Walker

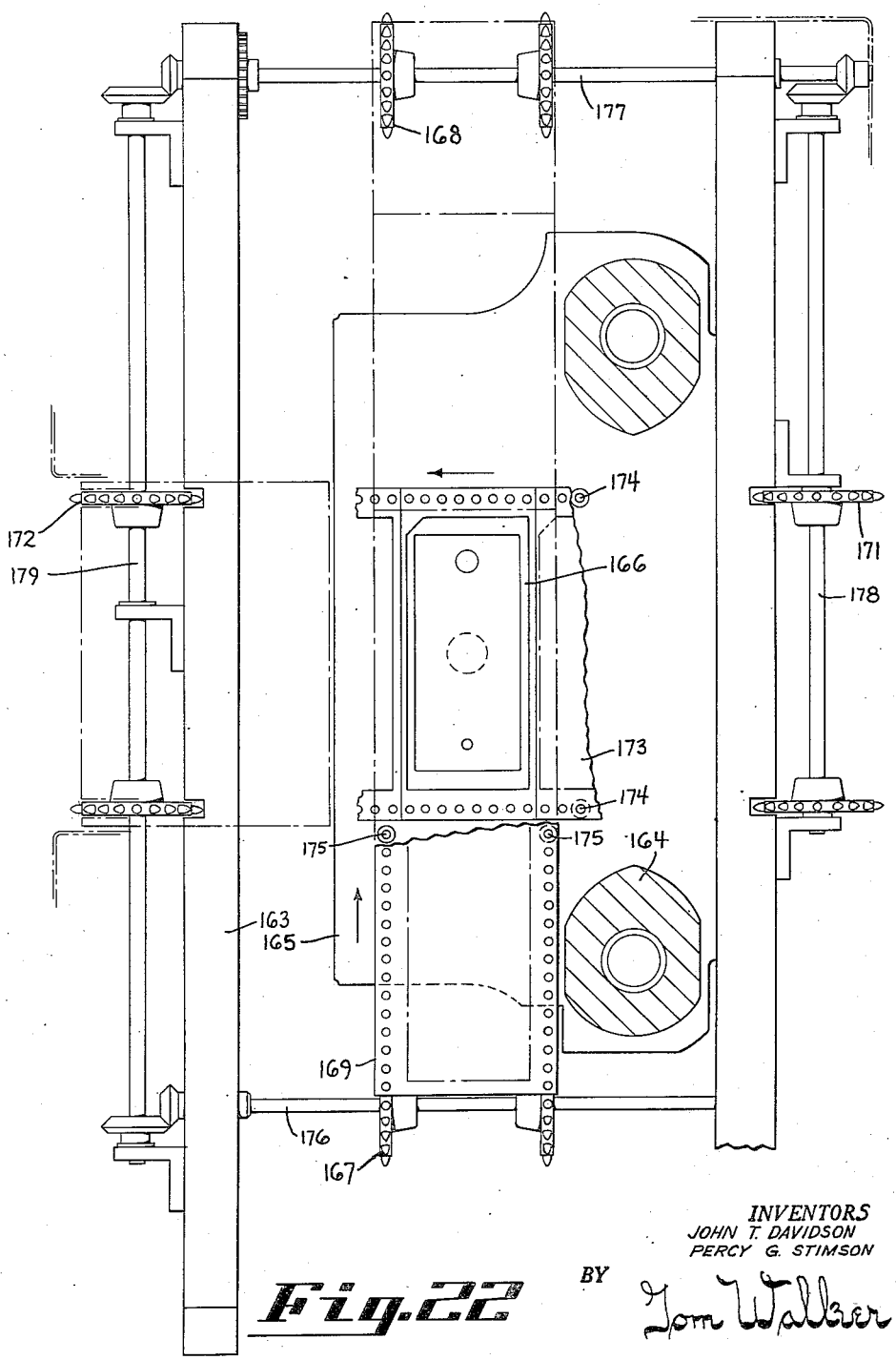

United States Patent Office 2,827,120
Patented Mar. 18, 1958

2,827,120

STRIP FEEDING AND CUTTING MECHANISM

John T. Davidson and Percy G. Stimson, Dayton, Ohio, assignors to The Standard Register Company, Dayton, Ohio, a corporation of Ohio Application June 11, 1954, Serial No. 435,991

7 Claims. (Cl. 164—12)

This invention relates to strip feeding means, and more particular to a strip feeding device embodying means for cutting out record cards from a continuous web of card stock on which the record cards are pre-printed.

The invention has in view a generally new machine of the class described, which is more compact and readily portable than its predecessors, being especially adapted for office use in conjunction with record card controlled business machines where it is conveniently available to produce cards of whatever kind and number may be required.

The object of the invention is to simplify the construction as well as the means and mode of operation of strip feeding and cutting mechanisms whereby such mechanisms may not only be economically manufactured, but will be more efficient and satisfactory in use, of longer life, uniform in action and be unlikely to get out of repair.

It is a further object of the invention that the instant machine shall be fully automatic in operation, positive in action, and offer new and advantageous features of use and service.

It is a further object of the invention to provide an open pocket on the top of the machine so that the cut cards will be easily accessible to an operator.

Another object of the invention is to embody in the record strip feeding and cutting machine a means for punching the cards, as for example with pilot holes provided for greater accuracy of subsequent hand punching.

A further object of the invention is to provide for a positive maintenance of the sequential order of the cut cards.

Still another object of the invention is to positively align the cards in the strip for punching and cutting.

A still further object of the invention is to make a dual use of marginal perforation in the strip for feeding the strip and for alignment purposes.

Still another object of the invention is to provide simplified controls for carrying out the several strip feeding, punching and cutting operations in a timed sequence, it being an accessory object in this connection to insure that the cutting punch is withdrawn from the die whenever the machine is at rest so that a new strip may readily be inserted in the machine.

A still further object of the invention is to make the machine applicable without substitution or adjustment of parts either to a strip on which the cards are printed crosswise or to a strip on which the cards are printed endwise.

A further object of the invention is to provide a strip feeding and cutting mechanism possessing the advantageous structural features, the inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is shown one but obviously not the only embodiment of the invention, Fig. 1 is a view in perspective of a machine in accordance with the illustrative embodiment of the invention;

Fig. 3 is a top plan view of the machine, with an upper cover plate removed;

Fig. 4 is an end view of the machine, partly broken away and taken from the rear or infeeding end of the machine;

Fig. 5 is a view in perspective of a sub frame assembly, supported on the frame structure of Fig. 2;

Fig. 6 is a view in side elevation of parts supported on the sub frame member shown in Fig. 5;

Fig. 7 is a fragmentary view, in longitudinal section, taken substantially along the lines 7—7 of Fig. 4;

Fig. 8 is a view in exploded isometric of elements of the card blanking or cutting out means;

Fig. 9 is a fragmentary view in cross section, taken substantially along the lines 9—9 of Fig. 7;

Fig. 10 is a view similar to Fig. 8 of elements comprised in the card perforating means;

Fig. 11 is a top plan view of the machine, with the upper die unit removed and with the supporting stand and cover members also removed;

Fig. 12 is a fragmentary detail view in cross section taken substantially along the line 12—12 of Fig. 6 and showing particularly the means for relatively reciprocating the punch and die members;

Fig. 13 is a fragmentary detail view of a one-way clutch mechanism associated with the strip feeding apparatus, and is taken substantially along the line 13—13 of Fig. 11;

Fig. 14 is a fragmentary view in longitudinal section, taken substantially along the line 14—14 of Fig. 3;

Fig. 15 is a detail view, in section, taken substantially along the lines 15—15 of Fig. 13;

Fig. 16 is a view similar to Fig. 13, showing the parts in another operating position;

Fig. 17 illustrates a strip of the kind acted upon by the machine of the instant invention, a portion only of the strip being shown;

Fig. 18 is a fragmentary view, similar to Fig. 14 showing the parts in another operating position;

Fig. 19 illustrates a card as produced by the machine of the instant invention;

Fig. 20 is a view similar to Fig. 18, showing the parts in still another position of operation;

Fig. 21 is a detail view, in top plan, of a strip aligning pin; and

Fig. 22 is a fragmentary view, similar to Fig. 11 showing a modified construction of the machine of the invention.

Like parts are indicated by similar characters of reference throughout the several views.

Figure 1:
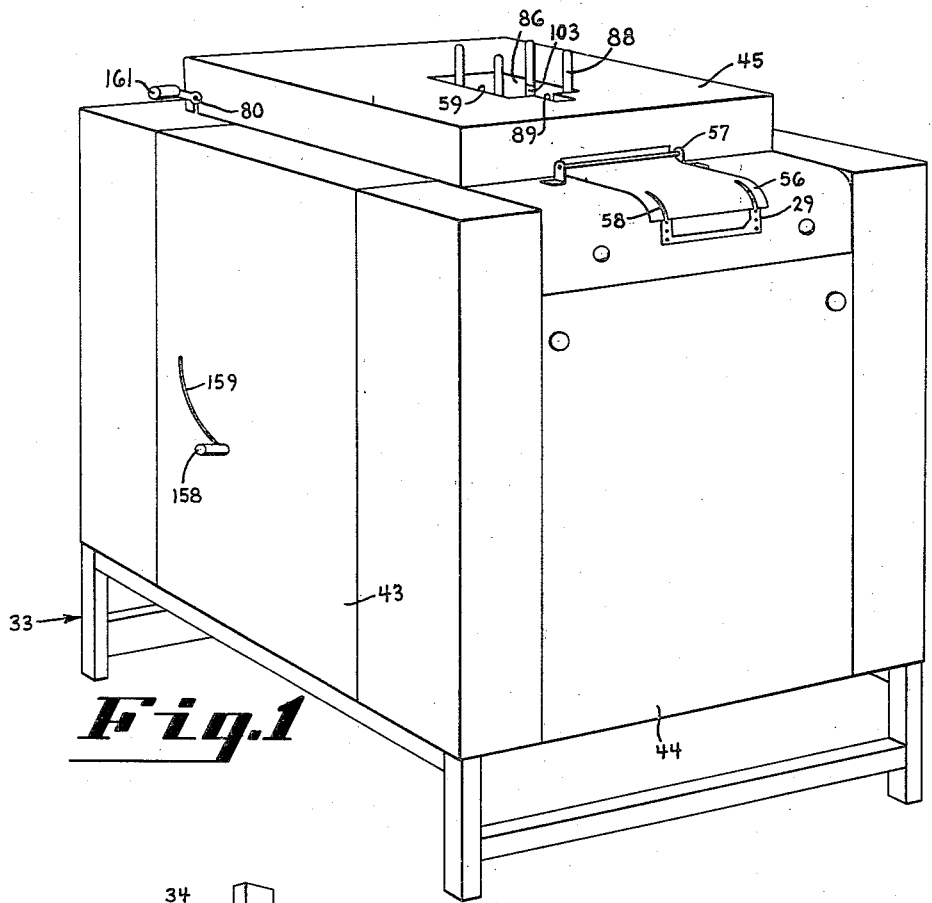

The machine functions to produce record cards 25, as illustrated in Fig. 19. These cards, used in punched card systems of record keeping and accounting, contain record information in the form of code perforations and, as shown, may also include an area 26 in which a part of the same or other record information may be typed or imprinted. In another portion of the card 25 are punch positions 27, used mainly for hand punching subsequent to the time that the card is originally perforated and put in use. According to the present invention, as a part of the same operation by which the card 25 is produced, pilot holes 28 are punched in the position 27, thus facilitating accurate hand punching with a tool equipped with a suitable pilot portion receivable in the holes 28.

The cards 25 are cut from a strip 29 (Fig. 17) on which they appear as pre-printed forms in series end to end relation. The strip 29 further comprises marginal perforations 31 and successive card forms are separated by transverse weakened division line 32. The lines 32 represent fold lines about which the strip is folded and refolded upon itself to define a pack. In its unitary form, the strip 29 may be put through preliminary or accessory operations as for example it may be fed through an addressograph machine for the purpose of having addresses printed in the spaces 26 of the successive cards.

The machine of the invention, through which the strip 29 is passed after it has been subjected to any desired preliminary recording operation, includes a supporting stand 33 (Figs. 1 and 2) appropriately formed and rigidly constructed out of angle iron or the like material. The stand 33 provides end supports 34 and 35 for an auxiliary frame structure 36 (Fig. 5). The latter is made up essentially of parallel side members 37 and 38 to which are attached footers 39 resting on the end members 34 and 35 of the stand 33. A plate 41 is rigidly suspended from the side members 37 and 38 by means of spacer studs 42. A casing assembly is mounted on the stand 33 to enclose the machine, such assembly including side and front panels 43 and 44 and a top lid or cover plate 45, some or all of the described cover members being readily removable for access to the interior of the machine.

Figure 2:
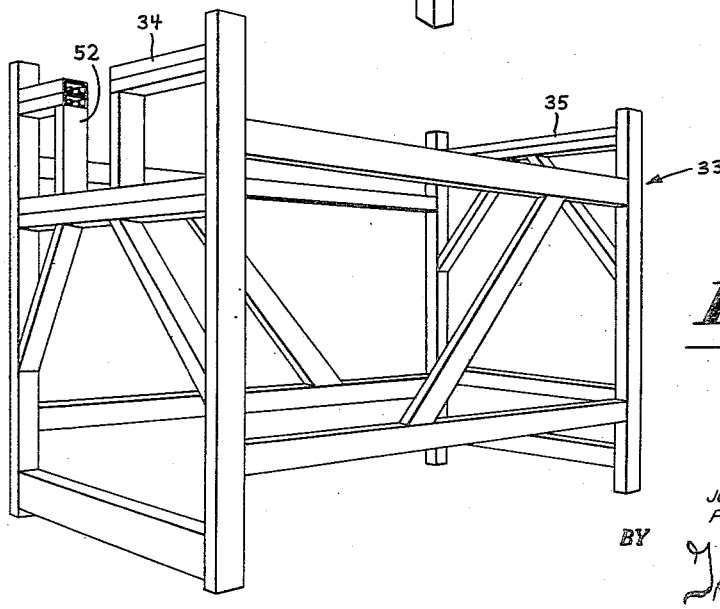
Fig. 2 is a view in perspective of a unitary frame structure for the machine, constituting a stand.

Referring to Figs. 3 and 6, a strip 29, folded in the form of a pack, is placed in a pack holder 46 at what may be considered to be the rear of the machine. The pack holder 46 is pivotally mounted by a bracket 47 on a rear cover plate 48. It is formed with a curved upper end over which the leading end of the strip passes through an opening in the cover 48 into cooperative relation with a guide plate 49. The plate 49 is formed at its inner or lower end with a table 51 received in a cut out portion 52 of the stand 33 (Fig. 2).

The plate 49 guides the strip to a pair of infeed pin wheels 53, which devices have continuous progressive engagement with the perforations 31 in the strip. Continuing beyond the pin wheels 53, the strip passes between relatively movable punch and die elements, to be described, and is engaged with another set of pin wheels 54, the sets of pin wheels 53 and 54 being disposed substantially at opposite ends of the machine and functioning respectively as infeed and outfeed devices. The strip is held in engagement with the pin wheel 53 by hold down pressure member 55 in overlying relation thereto. The strip is held in engagement with the pin wheels 54 by a hold down plate 56 pivoted to a bracket 57 on the front cover of the machine, the pin wheels 54 projecting through the cover plate and through slot 58 in the plate 56, all as is indicated in Fig. 1. As is further indicated in Fig. 1, the emerging strip fed out by the pin wheels 54 in merely a fragmentary web, the card form 25 having been cut out of the strip and stacked in a top central recess in the machine, access to which is had through an opening 59 in the cover member 45.

Referring to Fig. 11, the pin wheels 53 are fixed to a tranverse shaft 61 journalled between the side members 37 and 38 of the frame 36. The pin wheels 54 are similarly mounted on a shaft 62 similarly supported in the machine. Through suitable mitre gearing and a connecting shaft 63, the pin wheel shafts 61 and 62 are interconnected for unison rotation. Rotation of the pin wheel shaft is effected through a gear 64 (Fig. 14) made fast on the shaft 62. The gear 64 is indirectly driven by a rack 65. The rack 65 has a sliding mount on a cross bar 35 of the frame 36 and is pivotally connected to a lever 67 which in turn is pivotally connected at its mid point to a rigidly dependent bar 68 on the frame 36. The opposite end of the lever 67 is connected to a rod 69 extending from a crank arm 71 secured to a rotary shaft 72.

The rack 65 directly engages a pinion 73 (Figs. 11, 13 and 15). The pinion 73 is a part of a one-way clutch mechanism between the rack 65 and the gear 64. Such mechanism further comprises a single tooth ratchet 74 and a gear 75 formed integrally with the ratchet 74. The several elements 73, 74 and 75 have a rotating bearing on a stud 76 set in the stationary frame member 38 of the frame 36. A pawl 77 is pinned to the pinion 73 and rides the periphery of ratchet 74. A detent plate 78 is secured to the gear 75, the latter element being in continuous meshing engagement with the gear 64. The detent plate 78 is formed with a peripheral notch 79 engageable by a detent 81 mounted on the frame member 38 and spring urged into engagement with the peripheral edge of the detent plate 78 (see also Fig. 14).

It will be apparent that the construction and arrangement of parts is such that longitudinal motions of the rack 65 in one direction is without effect on the gear 64 whereas longitudinal motion of the rack in the opposite direction is effective to turn the gear 64 and thereby the pin wheel shafts 62 and 61. The described reciprocating motion of the rack 65 is effected by the shaft 72, acting through the crank 71, connecting rod 69 and lever 67. The arrangement is such as to move the rack 65 through one complete reciprocating motion for each revolution of the shaft 72. Further, it will be understood that rotation of the pin wheels 53 and 54 is related to rotation of the shaft 72, with the pin wheels turning during one part of the cycle of revolution of the shaft 72 to advance the strips and being idle through the remainder of the cycle of revolution.

The punch and die mechanism of the machine includes a stationary die plate 82 (Fig. 14) mounted on laterally projecting arms 83 and 84 of the frame 36 (see also Fig. 5). The arms 83 and 84 are undercut at 85 to define a guide passage for the strip 29 which passes beneath the arms 83 and 84 in underlying relation to the die plate 82. The die plate 82 is formed with a through opening 86 registering with the aforementioned access opening 59 in the top cover plate 45. The side walls of the opening 86 are formed with slots 87 in which are installed upwardly projecting fingers 88 constituting extensions of the opening 86 to define a relatively deep pocket to receive the cards after they have been cut out of the strip. A cut out, or recess 89 at one end of the opening 86 is provided to admit the fingers of the operator for removal of a stack of cut cards. A rigid mounting for the die plate 82 is provided by an angle piece 91 (Fig. 5) connecting the die plate to the frame element 37. The plate 82, as seen in Fig. 4, provides a mounting for the aforementioned hold down devices 55, which are secured to a shaft 80 rotatable in brackets 90 suspended from the plate 82. The devices 55 thus are mounted for swinging motion to an ineffective position to facilitate loading or insertion of a new strip in the machine. The strip contacting portions of the parts 55 are channel shaped and when in operative position are in embracing relation to the pins set in the periphery of the pin wheel devices 53.

Secured to the under side of the plate 82, and in effect forming an integral part thereof is a die element 92 (see Figs. 7 and 8). The element 92 has an opening 93 aligned with the plate opening 86 and forming a pattern. The upper end of the opening 93 substantially registers with the lower end of the opening 86, and the edge of the opening 93 tapers downwardly in an inward direction to the precise size for cutting out of the card 25 from the strip. The element 92 has cut out portions 94 registering with and forming continuations of the slots 87. A strip holding plate 95 is secured to the under side of the die element 92. The plate 95 has an opening 96 registering with the die opening 93, and further is formed with side laminations 97 which in effect space the plate 95 from the element 92 to define a slideway 98 (see Fig. 12) for the strip.

The actual cutting out of the card is accomplished by a punch element 99 which underlies the die plate and die elements and is receivable in the aligned openings 86 and 93 thereof. The punch 99 is mounted on a plate or holder 101 arranged beneath the plate 82 for reciprocating motion toward and from the plate whereby to move the punch 99 into and out of the die opening 93, cutting from the interposed strip 29 a card 25 and pushing it upward into the opening 86. Recessed in the upper surface of the punch 99 is a plate 102, the function of which is to raise a cut card farther into the opening 86, pressing it past spring fingers 103 which are mounted in the slot 87. After a card has passed the fingers 103 the fingers return to a position of retention with respect to such card. The holder 101 is held in alignment with the die plate 82 by posts 104 on the plate 101 slidable in bearings 105 on the plates 82.

The punch holder 101 further is formed with a dependent stem portion 106 received in a socket member 107. The member 107 is in turn detachably connected to a coupling assembly 108 having a sliding mount in the previously mentioned stationary frame plate 41. The coupling assembly 108 is in turn connected by a universal joint 109 to a collar 110 loosely surmounting an eccentric formation 111 on the aforementioned rotary shaft 72. The arrangement, it will be understood, is such as to provide for one complete reciprocating movement of the punch holder 101 and elements 99 thereof for each cycle of revolution of the shaft 72.

Also mounted on the punch holder 101, in adjacent relation to the punch element 99, is a locating pin 112. On the upward stroke of the holder 101 the pin 112 has access, through an opening 113 in the plate 95, to a marginal perforation 31 in the strip 29, the pin 112 passing through such perforation and into a clearance opening (not shown) in the die element 92. The pin 112 may advantageously take the form shown in Fig. 21 wherein it is flattened or elongated in a transverse sense to engage opposing sides of a perforation 31 while being spaced from opposing ends thereof. The arrangement thus provides that the pin 112 will enforce a lateral alignment of the strip 29 relatively to the punch and die element while permitting some slight longitudinal adjustment of the strip as may be involved in straightening out the creases which may be present at the fold lines 32. As seen in Fig. 12, the locating pin 112 is relatively longer or higher than the punch element 99. The strip 29 is thus engaged and adjusted by the pin 112 before being acted upon the punch element 99.

The lift plate 102 is connected to the upper end of a rod 120 (Fig. 14). The rod 120 extends downwardly through the punch element 99 and punch holder 101 and at its lower end is connected to one end of a rocker arm 114. The arm 114 is pivotally mounted intermediate its ends on a shaft 115 and on its other end carries a stud 116 engageable by a cam 117 on a shaft 118. The shaft 118 is supported between the outer ends of stationary frame arms 119 (see also Fig. 5) mounted on the stationary frame part 41. The cam 117 is secured to the shaft 118 and is constructed to effect in co-operation with the stud 115 a complete oscillating motion of the rocker arm 114 for each complete revolution of the shaft 118. Also secured to the shaft 118 is a sprocket wheel 121 engaged with a chain 122 (Fig. 6). The chain 122 also is engaged with a sprocket wheel 123 (Fig. 12) fastened on the shaft 72, and, for tension adjustment purposes, is still further engaged by a sprocket wheel 123. The wheel 123 has an adjustable mounting in one of a pair of brackets 124 suspended from the arms 119. The brackets 124 also support therebetween the shaft 115 which provides a pivotal mounting for the rocker arm 114. The lift plate 102 is thus also driven from the rotary shaft 72 and is raised and lowered in accompaniment with motion of the shaft 72 and in a timed relation to other operations of the machine.

The mechanism for forming the pilot holes 28 (Fig. 19) in the strip is located in advance of the card cut out apparatus above described, having reference to the direction of movement of the strip. Thus, and referring to Figs. 9, 10 and 14, there is mounted on the punch holder 101, along side the punch element 99, a wall 125 supporting in vertically spaced relation to the holder 101 a die plate 126. In the upper surface of the die plate 126 is a punch plate 127 having a series of holes 128 therein, it being understood that the plate 127 is replaceable to the end that the pattern of holes 128 may be varied as desired. In overlying relation to the plate 126, and secured to the under side of the die plate 82 is a plate assembly 129 bolted to the plate 82 by bolts 131 and carrying punch pins 132, the pins 132 registering with corresponding opening 128 in the punch plate 127. Between the assembly 129 and the plates 126 is a stripper member 133 having openings 134 receiving the punch pins 132. A strip support 135 is bolted to the under side of the member 133 in a manner to define a slideway 136 for the strip 29, the slideway 136 being aligned with the previously mentioned slideway 98. The assembly comprising the stripper member 133 and strip support 135 is suspended from the die plate 82 by bolts 137. The bolts 137 are slidably mounted in the plate 82 so as to permit relative lifting and return motion of the parts 133 and 135. The described parts are further connected to the plate 82 by dowel pins 138 maintaining a proper parallelism of the plate 133 relatively to the plate 82. Compression springs 139 surround the bolts 137 and tend to extend the member 133 relatively to the plate 82.

It will be evident that as the plate 101 rises to cause punch 99 to cut a card from the strip, there takes place at the same time an elevating motion of the plates 126—127 relative to the stripper plate or member 133. As the lifting motion of the holder 101 continues, the plate 126 contacts the stripper member 133 and moves it relatively to the punch pins 132, allowing these pins to penetrate the openings 128 in the plate 127, in the course of which action the pins 132 perforate the strip thereby to define the pilot holes 28. In this perforating operation the strip is pressed by the plate 126 against the stripper member 133. Return motion of the stripper member, initiated by the springs 139, serves to disengage the strip from the pins 132.

The perforating mechanism further includes a locating pin 141 seated in the punch holder 101 held in a recess 142 in the wall 125. The pin 141 extends above or beyond the plate 126 and is adapted to enter and pass through an opening 143 (Fig. 10) in the stripper member 133 by way of a perforation 31 in the strip 29. The locating pin 141 is substantially full size relative to the perforations 31 and is longitudinally aligned with the previously described locating pin 112. The pair of pins 112 and 141 cooperate in aligning the strip 29 for action by the perforating mechanism and the card cut out mechanism. The pin 112 may, as previously described, function primarily to enforce a lateral adjustment of the strip, while the pin 141 positively positions the strip in both a longitudinal and lateral sense. In this connection, the feeding pins on the pin wheels 53 and 54 are not ordinarily full size with respect to the perforations 31 since a greater freedom of movement of the pins into and out of the perforations is obtained if the pins are somewhat under size relative to the perforations. The locating pins 112 and 141 thus perform a function in connection with the pin wheels 53 and 54 in positively aligning the strips for action by the perforating mechanism and the card cutout mechanism, provision being made, however, by reason of the cut away formation of the pins 12 for climatic induced expansion and contraction of the strip.

With continued reference to the perforating mechanism, the bits of strip stock which are cut out by the punch pins 132 drop into a well 140 defined by the wall 125. From the well 140, these bits or cuttings may escape through holes 140' in the punch holder 101 to a chute 144 and be deposited in a tray 145 forming a part of the previously mentioned table 51. In this same regard, paper dust may tend to accumulate above and around the punch element 99. A spiral groove 146 is formed in the surface of the push rod 120 in this connection so that the dust may have a route of escape out of the machine.

As indicated in Figs. 7 and 8, the die element 92 and the punch pin support 129 are aligned with one another and may be integrally formed. The stripper member 133 is beneath the plate assembly 129 and is made wider to accommodate the dowels 138 and bolts 137. The strip support 135 is or may be made integral with the stripper 133 but is relatively elongated toward the front paper support 95 in order that substantially uninterrupted support may be given to the strip.

As seen in Figs. 4 and 6, the motive power for rotating the shaft 72 is derived from an electric motor 147 stationarily mounted on the stand 36. The motor shaft 148, through a pulley wheel 149 and belt 151 rotates, a fly wheel 152 and thereby the shaft 72 to which the fly wheel 152 is made fast. Suspended from the frame part 41 is a switch bracket 153 for mounting a motor control switch 154 and actuating means for the switch in the form of a cam 155 on a shaft 156. The shaft 156 extends outside the machine, through a side panel 43 and terminates in a crank 157, the handle 158 of which extends through a slot 159 in a side cover panel 43 (Fig. 1) where it is accessible to rotate the cam 155 whereby to start and to stop the machine. Also as indicated in Fig. 1, another handle 161 is accessible from outside the machine, this handle being made fast to the shaft 80 (Fig. 4) on which is mounted the pair of hold down means 55.

It will be understood that the various described mechanisms of the machine operate in a suitably timed relationship to one another. Briefly considering successive operations of the machine, it is a feature of the connections between the motor 147 and the punch holder 101 that when the motor 147 is shut off the shaft 72 always assumes a position with the eccentric 111 in down position, in which position the punch element 99 is lowered out of the path of movement of the strip. Thus, at any time that the machine is idle, a new strip may be inserted. Assuming the machine to be operating upon a strip already installed in the machine, the parts will at rest normally occupy a position substantially as illustrated in Figs. 6 and 12. When the motor 147 is turned on, the shaft 148 thereof rotates in a counterclockwise direction (Fig. 6), effecting a corresponding direction of rotation of the shaft 72 through the belt 151. Considering the shaft 72 to have motion through four successive quarters of a revolution, in the first quarter thereof the parts on the shaft move from the position shown in Fig. 6 to the position shown in Fig. 14. In the course of this movement the punch holder 101 is raised through the coupling 108 and socket 107 to lift the punch element 99 and the plate 126 of the perforation mechanism toward the strip 29 or to a position wherein the locating pins 112 and 141 are about to enter respective perforations 31 in the strip. Also, in this first quarter of revolution of the shaft 72, the crank arm 71 on the shaft 72 moves leftward to effect through the rod 69 and lever 67 a full travel of the rack 65 in a righthand direction or toward the front of the machine. This motion, transmitted through the pinion 73, ratchet 74 and gear 75 is effective to rotate the gear 64 and thereby the pair of pinwheel shafts 61 and 62. The strip 29 accordingly is advanced in the first quarter revolution of the shaft 72 and it will be understood that the distance advanced is precisely determined to move one card form 25 out of what may be considered the perforating station into the card cut out station and to move the next following card into the perforating station.

Also in the first quarter revolution of the shaft 72 the chain 122 is actuated to rotate the cam 117. Since, however the plate 102 has been raised with the punch element 99, the stud 116 on the arm 114 has been moved away from the cam 117, the lobe of which is in any event circumferentially spaced from the stud 116 during the first quarter revolution of the shaft 72.

In the second quarter revolution of the shaft 72, the parts move substantially from the position shown in Fig. 14 to the position shown in Fig. 18. In the course of this movement the crank arm 71 returns the rack 65 toward its starting position of Fig. 6. This motion is without effect on the pin wheels 53 and 54 since the pawl 77 rides over the periphery of the ratchet 74 so that the strip 29 remains stationary in the machine. Also in this part of the cycle, the punch holder 101 continues to rise toward the die plate 82. Early in this continued motion, the locating pins 112 and 141 enter respective perforations in the strip and adjust and align the strip as may be necessary. Following engagement of the locating pins with the strip, the punch element 99 begins to enter die opening 93 and perforation plate 126 begins to press on the stripper member 133. As these motions are continued, the card form aligned with die opening 93 is cut out of the strip and pushed upward in the die plate opening 86. At the same time, the punch pins 132 of the perforating mechanism are caused to pass through the strip and into the opening 128 of the punch plate 127, resulting in formation of the pilot holes 28. Still further, as the second quarter of revolution of the shaft 72 is concluded, the cam 117 lies substantially at a point of contact with the pin 116 on rocker arm 114.

The third quarter revolution of the shaft 72 continues the retraction of the rack 65 without effect on the pin wheel devices. It also, as indicated in Fig. 20, starts a lowering movement of the punch holder 101 to begin to retract the punch element 99 out of the die opening 93 and to move the die plate 126 away from the stripper member 133. Also, the cam 117 effects a clockwise rocking motion of the arm 114 to elevate the push rod 120 and plate 102 attached to the upper end thereof. This motion is effective to lift the cut card 25 off of the punch element 99 and push it positively past the spring fingers 103 which then move in as before described to retain the ejected card and prevent it from following the plate 102 when it withdraws. There will ordinarily be a stack of cards in the pocket defined by opening 86 and extension members 88, and this stack is lifted slightly by the plate 102 while the last cut card is ejected to take its place at the bottom of the stack. Also as indicated in Fig. 20, continued motion of the cam 117 in the third quarter revolution of the shaft 72 serves to release the stud 116 and allow the plates 102 and rod 120 to drop by gravity to their normal positions relatively to the punch element 99.

As the shaft 72 completes its third quarter revolution and proceeds through the fourth quarter revolution back to the starting position of Fig. 6, the punch element 99 and die plate 126 are retracted out of the plane of the strip 29 and the locating pins 112 and 141 are disengaged from the strip. Also, the rack 65 is retracted its full extent and the cam 117 continues to move away from the stud 116, the several parts returning finally to the positions shown in Fig. 6 preparatory to starting a new cycle of operation.

The modification proposed in Fig. 22 comprises essentially the same structure as that heretofore disclosed with the addition of a second set of pin wheels operable to advance a strip in a path substantially at right angles to the path of the strip in the primary or first considered embodiment of the invention. Thus, it is contemplated in a machine as constructed in Fig. 22 that card forms may be cut out of a strip in the manner there disclosed whether such forms are printed on the strip in an end wise relation to one another or crosswise of the strip.

As shown in Fig. 22, a machine in accordance with this form of the invention comprises a frame structure 163 supporting a stationary die plate 164 indicated by cross sectioned bearings in which aligning posts of the underlying die holder 165 are slidable. The die holder 165 includes a reciprocating punch element 166 registering with an opening in the die plate 164 and received therein for cutting cards out of the strip material fed thereover. Infeed pin wheels 167 and outfeed pin wheels 168 are arranged as in the first considered embodiment of the invention to direct a strip 169 over the punch element 166, the card forms on the strip 169 being end to end relation to one another. Further in accordance with the invention as illustrated in Fig. 22, however, there is provided another set of infeed pin wheels 171 and another set of outfeed pin wheels 172 located to feed or advance a strip 173 at right angles to the direction of motion of the strip 169. The pin wheels 171 and 172 are arranged to direct the strip 173 over the punch element 166 which is effective in the same manner and through substantially the same means as heretofore disclosed to cut out of the strip card forms which in this instance are arranged crosswise on the strip.

This form of the invention also contemplates use of locating pins 174 and 175 corresponding to the pins 112 and 141. In this instance, however, the locating pins engage opposite marginal edges of the strip rather than longitudinally spaced points on the same marginal edge.

The pinwheels 167 and the pinwheels 168 are mounted on respective shafts 176 and 177. The pinwheels 171 and 172 are mounted on respective shafts 178 and 179. The several pinwheel shafts are mounted on the frame 163 and are suitably interconnected, as by mitre gearing for rotation as a unit.

In both considered embodiments of the invention there may be provided in the press mechanism depressions or surface relief formations designed to prevent or avoid smearing of ink in the areas 26 of the card form. As shown in Fig. 10 the punch plate 127 of the perforating mechanism has a formation 181 for this purpose, and as seen in Fig. 3 the lift plate or platform 102 has a similar formation 182.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. An apparatus for fabricating record forms from a marginal perforated strip of material comprising cutting elements mounted for reciprocal movement towards and away from the strip, means on said elements engaging perforations in the perforated strip material in advance of said cutting elements contacting the perforated strip material to accurately align the strip material in relation to the cutting elements, said means comprising at least two pins, one of which is relatively modified in cross sectional configuration with respect to the other, power means for advancing the marginal perforated strip past said cutting elements and for reciprocating the cutting elements thereby forming a record form, said power means being inoperative to advance the marginal perforated strip when the cutting elements are operating on the strip material.

2. The structure according to claim 1, wherein said pins have a common mounting means and a single control means for projecting said mounting means to project said pins toward the perforated strip material.

3. The structure according to claim 1, characterized by a common reciprocal mount for said cutting elements and said pins, said pins being elongated relative to said cutting elements to engage the strip material prior to its engagement by said cutting elements.

4. The structure according to claim 1, wherein at least one of said aligning pins has a formation to enforce lateral adjustment of the strip material in relation to the cutting elements, said pin being reduced in dimension at right angles thereto to provide limited longitudinal adjustment of the strip relative thereto.

5. The structure according to claim 1, wherein one of said aligning pins is of a size substantially to fill a strip perforation while the other pin is shaped to engage only a part of the peripheral edge of a strip perforation.

6. The structure according to claim 1, wherein one of the cutting elements includes a die supported in a generally horizontal position and having an opening therein, a reciprocable punch holder beneath said die, a punch on said holder receivable in said opening, said punch cutting a record form from the strip and pushing it into said die opening.

7. The structure according to claim 1, in which the cutting elements comprise punch pins for forming perforations in the body of the record forms, and a cutting element for cutting the record forms with the perforations therein from the strip material.

References Cited in the file of this patent

UNITED STATES PATENTS

| | | |
|---|---|---|
| 44,871 | Livermore | Nov. 1, 1864 |
| 788,851 | Schneider | May 2, 1905 |
| 966,160 | Brady | Aug. 2, 1910 |
| 1,297,637 | Benon | Mar. 18, 1919 |
| 1,454,877 | Winkley | May 15, 1923 |
| 1,480,044 | Bowers et al. | Jan. 8, 1924 |
| 1,648,549 | Jensen | Nov. 8, 1927 |
| 1,669,164 | Holman | May 8, 1928 |
| 1,708,540 | Greenbaum et al. | Apr. 9, 1929 |
| 1,729,123 | Philip | Sept. 24, 1929 |
| 1,736,049 | Nordendale | Nov. 19, 1929 |
| 1,851,753 | Crane | Mar. 29, 1932 |
| 1,872,474 | Lindgren | Aug. 16, 1932 |
| 2,260,899 | Heftler | Oct. 28, 1941 |
| 2,315,731 | Paris | Apr. 6, 1943 |
| 2,342,049 | Holmbeck | Feb. 15, 1944 |
| 2,357,557 | Sherman et al. | Sept. 5, 1944 |
| 2,378,041 | Sebell | June 12, 1945 |
| 2,547,168 | Nill et al. | Apr. 3, 1951 |
| 2,683,487 | Conner | July 13, 1954 |
| 2,721,077 | Russell et al. | Oct. 18, 1955 |